United States Patent
Barcohen et al.

(10) Patent No.: US 10,229,086 B2
(45) Date of Patent: Mar. 12, 2019

(54) TECHNOLOGIES FOR AUTOMATIC TIMING CALIBRATION IN AN INTER-INTEGRATED CIRCUIT DATA BUS

(71) Applicant: Intel Corporation, Santa Clara, CA (US)

(72) Inventors: Yuli Barcohen, Nokdim (IL); Eli Kupermann, Maale Adumim (IL); Alexander Brill, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 507 days.

(21) Appl. No.: 14/998,310

(22) Filed: Dec. 26, 2015

(65) Prior Publication Data

US 2017/0185560 A1    Jun. 29, 2017

(51) Int. Cl.
*G06F 13/42* (2006.01)
*G06F 9/22* (2006.01)

(52) U.S. Cl.
CPC .......... *G06F 13/4291* (2013.01); *G06F 9/226* (2013.01); *G06F 13/4282* (2013.01)

(58) Field of Classification Search
CPC ... G06F 13/4291; G06F 9/226; G06F 13/4282
USPC ....................................................... 710/313
See application file for complete search history.

(56) References Cited

U.S. PATENT DOCUMENTS

| | | | | |
|---|---|---|---|---|
| 7,478,286 B2 * | 1/2009 | Humphrey | .......... | G06F 13/4291 714/43 |
| 7,502,953 B2 * | 3/2009 | Boecker | ................ | G06F 13/376 713/375 |
| 7,711,867 B2 * | 5/2010 | Deshpande | ......... | G06F 13/4291 710/14 |
| 7,809,873 B2 * | 10/2010 | Perry | ...................... | G06F 13/28 710/110 |
| 7,818,604 B2 * | 10/2010 | Saripalli | ............. | G06F 13/4291 713/600 |
| 8,032,745 B2 * | 10/2011 | Bandholz | .............. | H04L 9/3236 713/164 |
| 8,239,597 B2 * | 8/2012 | Wishneusky | ........... | H02J 1/102 710/107 |
| 8,954,634 B2 * | 2/2015 | DeCesaris | ........... | G06F 13/4291 710/15 |
| 8,959,380 B2 * | 2/2015 | Decesaris | ............... | G06F 13/38 713/503 |
| 9,128,690 B2 * | 9/2015 | Lotzenburger | .......... | G06F 1/266 |
| 9,645,898 B2 * | 5/2017 | Kidamura | ........... | G06F 11/1604 |
| 9,734,121 B2 * | 8/2017 | Pitigoi-Aron | ....... | G06F 13/4291 |
| 9,928,208 B2 * | 3/2018 | Sengoku | ............. | G06F 13/4291 |

OTHER PUBLICATIONS

I2C bus specification and user manual, revision 6.

* cited by examiner

*Primary Examiner* — Christopher B Shin
(74) *Attorney, Agent, or Firm* — Barnes & Thornburg LLP (57) ABSTRACT

Technologies for controlling timing calibration of a dedicated inter-integrated circuit data bus by a primary microcontroller are disclosed. The primary microcontroller performs a data transfer with a secondary integrated circuit using the dedicated inter-integrated circuit data bus, and determines a duration of the data transfer. If the duration is outside of an acceptable range, the primary microcontroller updates one or more data transfer timing parameters so that the duration of future data transfers are closer to the acceptable range.

25 Claims, 6 Drawing Sheets

TECHNOLOGIES FOR AUTOMATIC TIMING CALIBRATION IN AN INTER-INTEGRATED CIRCUIT DATA BUS

BACKGROUND

Simple communication protocols such as $I^2C$ (Inter-Integrated Circuit) are commonly used for low-speed communication between integrated circuits due to their simplicity, which make them cheap to implement, both due to the small amount of time needed to design hardware, firmware, and software to implement the protocol as well as the small number of components required to implement it, and the small footprint of those components.

One drawback of such a system is that small differences in the physical environment (such as a different capacitance) can lead to variations in performance of the protocol in a way that may not be addressed by the protocol specification.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
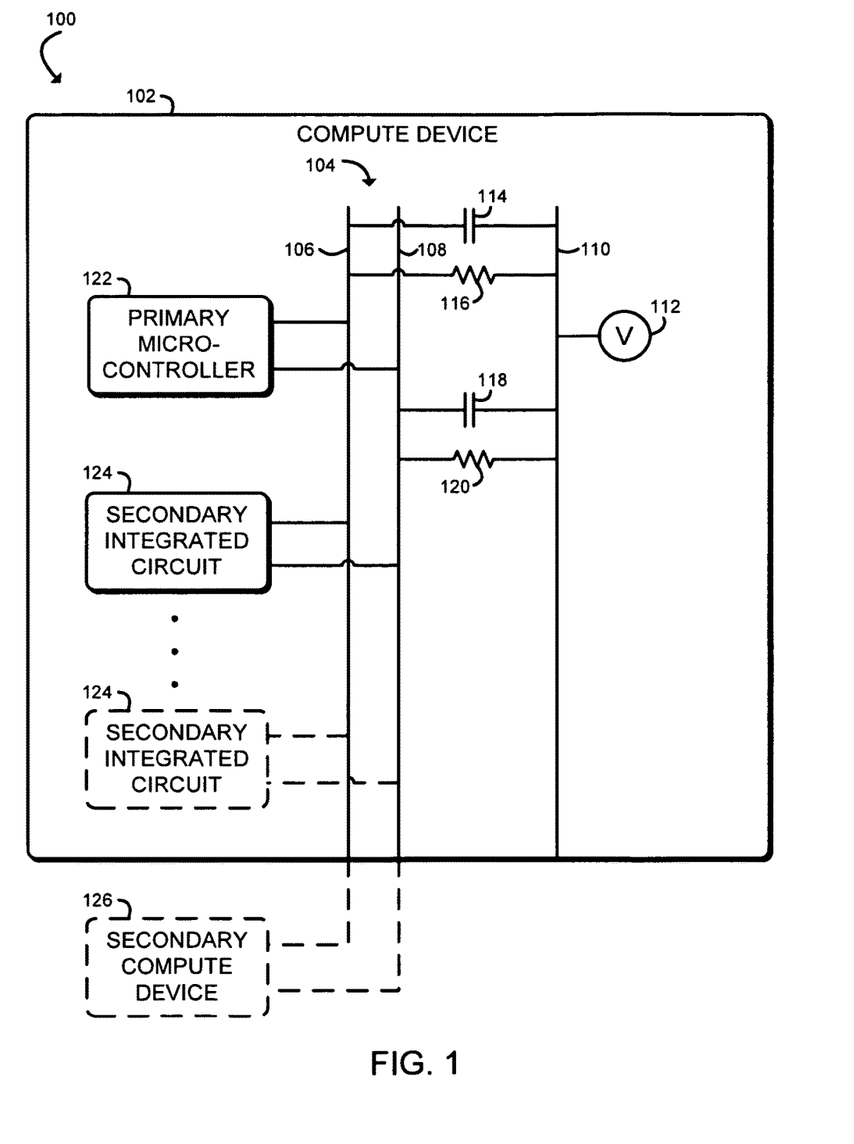
FIG. 1 is a simplified block diagram of at least one embodiment of a system for inter-integrated circuit communication using a dedicated inter-integrated circuit data bus.

Referring now to FIG. 1, an illustrative system 100 for inter-integrated circuit communication using a dedicated inter-integrated circuit data bus includes a compute device 102 and, in some embodiments, a secondary compute device 126. The compute device 102 includes a primary microcontroller 122 configured to communicate with one or more secondary integrated circuits 124 of the compute device 102 over a dedicated inter-integrated circuit data bus 104. In use, as described in more detail below, the primary microcontroller 122 is configured to communicate with one or more secondary ICs 124 over the data bus 104, using a serial communication protocol, such as inter-integrated circuit ($I^2C$), System Management Bus (SMBus), Power Management Bus (PMBus), or other serial communication protocol. The primary microcontroller 122 may communicate with the one or more secondary ICs 124 in order to control or interact with certain components or functions of the computing device 102, such as turning the compute device 102 on or off or reading temperature sensors, voltage sensors, and/or fan sensors. As part of the communication process, the primary microcontroller 122 is configured to determine the total duration of the data transfer and a corresponding frequency of the dedicated inter-integrated circuit data bus 104. If the frequency is higher or lower than a desired frequency, the primary microcontroller 122 updates one or more data transfer timing parameters in order to make the frequency of the dedicated inter-integrated circuit bus 104 closer to the desired frequency.

As shown in FIG. 1, the illustrative dedicated inter-integrated circuit data bus 104 includes a data line 106 and a clock line 108, a DC voltage supply line 110, a DC voltage supply 112, a capacitor 114 between the data line 106 and the DC voltage supply line 110, a resistor 116 between the data line 106 and the DC voltage supply line 110, a capacitor 118 between the clock line 108 and the DC voltage supply line 110, and a resistor 120 between the clock line 108 and the DC voltage supply line 110. Of course, the dedicated inter-integrated circuit data bus 104 may have other components and/or configuration in other embodiments. As part of sending a single bit of the communication in the illustrative embodiment of FIG. 1, the primary microcontroller 122 sets the data line 106 to the desired voltage level while the clock line 108 is low, and subsequently allows the clock line 108 to be pulled up to the voltage of the DC voltage supply line 110 by the resistor 120, as described in more detail below in regard to FIG. 2. After the clock line 108 reaches the high voltage level, the primary microcontroller 122 allows the clock line 108 to remain high for a period of time, based on one or more data transfer timing parameters of the compute device 102. During the period of time the clock line 108 is high, the secondary IC 124 reads the data line 106. After the period of time is over, the primary microcontroller 122 pulls the clock line 108 down to a low voltage, as described in more detail below in regard to FIG. 2. After the clock line 108 reaches the low voltage level, the primary microcontroller 122 keeps the clock line 108 low for a second period of time, based on the one or more data transfer timing parameters. The process of sending a single bit described above may repeat one or more additional times, with a corresponding rise and fall of the clock line 108 with the sending of each bit. As discussed above, the primary microcontroller 122 is configured to determine the total duration of the data transfer and a corresponding frequency of the clock line 108. If the frequency is higher or lower than a desired frequency, the primary microcontroller 122 updates the one or more data transfer timing parameters in order to make the frequency of the clock line 108 closer to the desired frequency.

Each of the data line 106, the clock line 108, and the DC voltage supply line 110 may be embodied as a conductive wire. The DC voltage supply 112 supplies a voltage of approximately 5 volts to the DC voltage supply line 110 in the illustrative embodiment. In additional embodiments, the DC voltage supply 112 may supply a different voltage, such as 3.3 volts, 10 volts, or the like. In the illustrative embodiment, each of the capacitors 114 and 118 are embodied as a parasitic capacitance. In additional embodiments, each of the capacitors 114 and 118 may be embodied as a discrete capacitive circuit element, or may be embodied as a distributed capacitance. Each of the resistors 116 and 120 may be embodied as a discrete resistive circuit element, or may be embodied as a distributed resistance, such as a parasitic resistance. Of course, it should be appreciated that every element connected to the data line 106 and the clock line 108 affects the parasitic capacitance and parasitic resistance of the data line 106 and the clock line 108, including the primary microcontroller 122 and the one or more secondary ICs 124. The effect of the capacitors 114 and 118 and the resistors 116 and 120 are described in more detail below in regard to FIGS. 2 and 3.

The primary microcontroller 122 may be embodied as any type of microcontroller or integrated circuit capable of managing communications on the dedicated inter-integrated circuit data bus 104 and performing the functions described herein, such as a processor, system-on-a-chip (SoC), or the like. Each secondary integrated circuit 124 may also be any type of microcontroller or integrated circuit capable of performing the functions of the compute device 102 (e.g., graphics, communications, etc.), such as a processor, SoC, or the like. In some embodiments, one or both of the primary microcontroller 122 and the secondary integrated circuit 124 may be embodied as a collection of circuitry capable of performing the function described herein without being capable of general computing tasks.

It should be appreciated that communication via dedicated inter-integrated circuit data bus 104 need not be limited to within the compute device 102 in system 100. For example, in some embodiments, the dedicated inter-integrated circuit data bus 104 may extend outside of the compute device 102, and be connected to one or more secondary compute devices 126 (e.g., to a secondary IC located in the secondary compute device 126). Additionally, in some embodiments, the system 100 may include more than one primary microcontroller 122 connected to the data bus 104 (internal or external to the compute device 102) as well as or instead of the one or more secondary ICs 124. In additional embodiments, one or more of the secondary ICs 124 may be capable of performing the function of the primary microcontroller 122.

Figure 2:
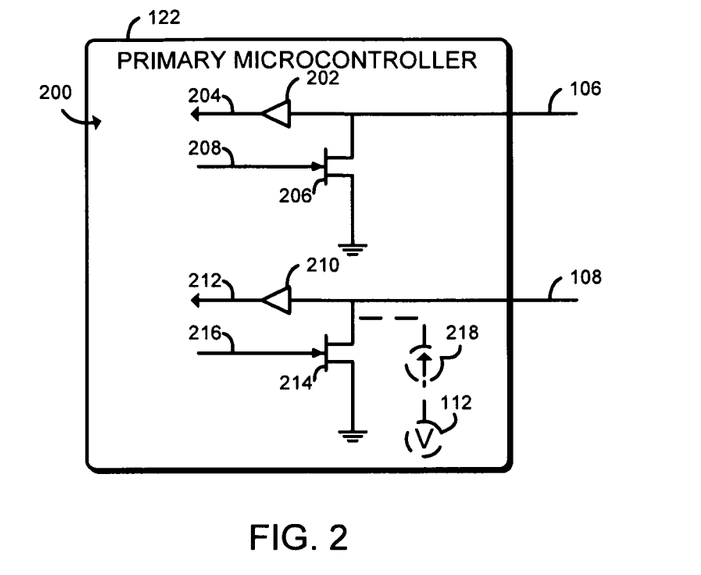
FIG. 2 is a simplified block diagram of at least one embodiment of a primary micro-controller of the system of FIG. 1.

Referring now to FIG. 2, in the illustrative embodiment, the primary microcontroller 122 is coupled to the dedicated inter-integrated circuit data bus 104 via an electrical interface 200. The illustrative electrical interface 200 includes a data read buffer 202, a data read wire 204, a data pull-down transistor 206, a data pull-down transistor controller wire 208, a clock read buffer 210, a clock read wire 212, a clock pull-down transistor 214, and a clock pull-down transistor controller wire 216. The data read buffer 202 is configured to read the analog voltage of the data line 106 and provide a digital voltage output to the data read wire 204, which allows the primary microcontroller 122 to read the digital value of the data line 106. When the data pull-down transistor 206 is open (i.e., when the data pull-down transistor controller wire 208 is low), the primary microcontroller 122 is not actively controlling the voltage on the data line 106. If each integrated circuit connected to the data line 106 is similarly not actively controlling the voltage on the data line 106, the data line 106 will be pulled up to the DC voltage supply line 110 by the resistor 116.

When the data pull-down transistor 206 transitions from open to closed (i.e., when the data pull-down transistor controller wire 208 is high, allowing current to flow through the data pull-down transistor 206), the data line 106 will be pulled down to ground. The time it takes to pull the data line 106 to ground depends on the current the data pull-down transistor 206 can carry (limited by, e.g., internal resistance of the data pull-down transistor 206 or intrinsic resistance of the wire of the data line 106) and the amount of charge that needs to be moved based on the capacitance of the capacitor 114. Similarly, when the data pull-down transistor 206 transitions from closed to open, the amount of time it will take for the data line 106 to be pulled up to the voltage of the DC voltage supply line 110 depends on the resistance of the resistor 116 and the capacitance of the capacitor 114. Note that, since the capacitance of the capacitor 114 and/or the resistance of the resistor 116 may be distributed, and may be influenced by the connection or disconnection of one or more secondary ICs 124, the rise time and fall time of the data line 106 may depend on which secondary ICs 124 are connected. The primary microcontroller 122 reads and writes the clock line 108 in a similar manner as the data line 106, which will not be repeated for the sake of brevity.

Optionally, the primary microcontroller 122 includes a controllable current source 218, which may be activated by the primary microcontroller 122 to source current from the DC voltage supply 112 to the clock line 108. The primary microcontroller 122 may activate the current source 218 at or near the time when the primary microcontroller 122 transitions the clock pull-down transistor 214 from closed to open. Activating the current source 218 will then have the effect of pulling up the clock line 108 to the voltage of the DC voltage supply 112 faster than the resistor 120 alone.

Figure 3:
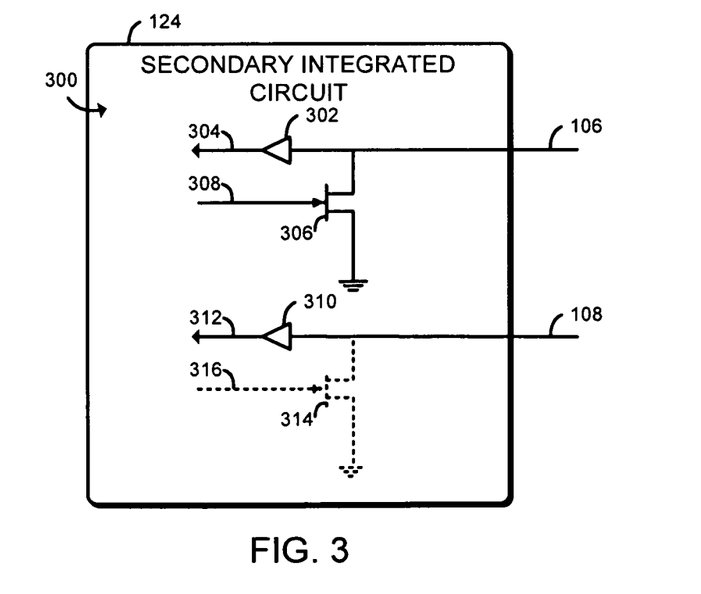
FIG. 3 is a simplified block diagram of at least one embodiment of a secondary integrated circuit of the system of FIG. 1.

Referring now to FIG. 3, in the illustrative embodiment, each secondary IC 124 is coupled to the dedicated inter-integrated circuit data bus 104 via an electrical interface 300. The illustrative electrical interface 300 includes a data read buffer 302, a data read wire 304, a data pull-down transistor 306, a data pull-down transistor controller wire 308, a clock read buffer 310, and a clock read wire 312. The secondary IC 124 reads and writes the data line 106 and reads the clock line 108 in a similar manner as the primary microcontroller 122, as described above in regard to FIG. 2. For the sake of brevity, a detailed description of reading and writing the data line 106 and the clock line 108 will not be repeated. Optionally, the secondary IC 124 may also be able to write the clock line 108 using a clock pull-down transistor 314 and a clock pull-down transistor controller wire 316 in a similar manner as the primary microcontroller 122. In one embodiment, the secondary IC 124 may "stretch" the time that the clock line 108 is low, even after the primary microcontroller 122 has allowed the clock line 108 to float to high. Such "clock stretching" may be useful if the secondary IC 124 is not yet prepared for further data.

Figure 4:
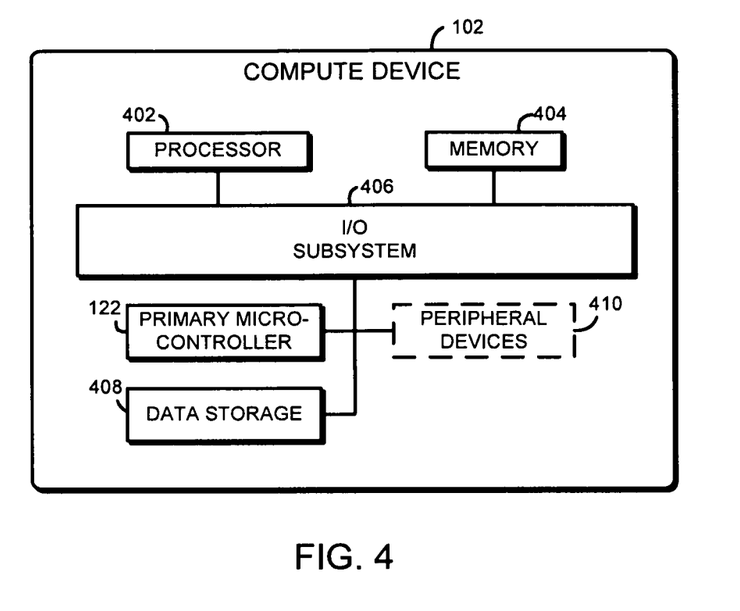
FIG. 4 is a simplified block diagram of at least one embodiment of a compute device of FIG. 1.

Referring now to FIG. 4, the compute device 102 may be embodied as any type of compute device capable of performing the functions described herein. For example, the compute device 102 may be embodied as or otherwise be included in, without limitation, a desktop computer, a server computer, an embedded computing system, a System-on-a-Chip (SoC), a smartphone, a cellular phone, a tablet computer, a notebook computer, a laptop computer, a wearable computer, a handset, a messaging device, a camera device, a multiprocessor system, a processor-based system, a consumer electronic device, and/or any other compute device.

The illustrative compute device 102 includes a processor 402, a memory 404, an input/output (I/O) subsystem 406, a primary microcontroller 122, and data storage 408. Additionally, the compute device 102 includes one or more secondary ICs 124 as shown in FIG. 1, which may be embedded in or form part of other components of the compute device (e.g., a graphics engine, an input/output interface, a communication device, etc.). In some embodiments, one or more of the illustrative components of the compute device 102 may be incorporated in, or otherwise form a portion of, another component. For example, the memory 404, or portions thereof, may be incorporated in the processor 402 in some embodiments.

The processor 402 may be embodied as any type of processor capable of performing the functions described herein. For example, the processor 402 may be embodied as a single or multi-core processor(s), a single or multi-socket processor, a digital signal processor, a microcontroller, or other processor or processing/controlling circuit. Similarly, the memory 404 may be embodied as any type of volatile or non-volatile memory or data storage capable of performing the functions described herein. In operation, the memory 404 may store various data and software used during operation of the compute device 102 such as operating systems, applications, programs, libraries, and drivers. The memory 404 is communicatively coupled to the processor 402 via the I/O subsystem 406, which may be embodied as circuitry and/or components to facilitate input/output operations with the processor 402, the memory 404, and other components of the compute device 102. For example, the I/O subsystem 406 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 406 may form a portion of a system-on-a-chip (SoC) and be incorporated, along with the processor 402, the memory 404, and other components of the compute device 102 on a single integrated circuit chip.

The data storage 408 may be embodied as any type of device or devices configured for the short-term or long-term storage of data. For example, the data storage 408 may include any one or more memory devices and circuits, memory cards, hard disk drives, solid-state drives, or other data storage devices.

Of course, in some embodiments, the compute device 102 may include other or additional components, such as those commonly found in a compute device. For example, the compute device 102 may also have peripheral devices 410 such as a display, keyboard, mouse, camera, speaker, etc.

As described above, the primary microcontroller 122 is configured to communicate over the data bus 104 with one or more secondary ICs 124 (see FIG. 1). As discussed above, the one or more secondary ICs 124 may be embodied as one or more of the components shown in FIG. 4, such as the processor 402, the memory 404, the data storage 408, etc. In some embodiments, the data bus 104 may be embodied as, or otherwise form a part of, the I/O subsystem 406. Additionally or alternatively, the data bus 104 may be embodied as or otherwise form a part of a bus different from the I/O subsystem 406. In additional embodiments, the primary microcontroller 122 may not be a separate discrete element of the compute device 102, but may instead be form a part of or otherwise be embodied in one or more of the components of the compute device 102, such as the processor 402, the memory 404, etc.

Figure 5:
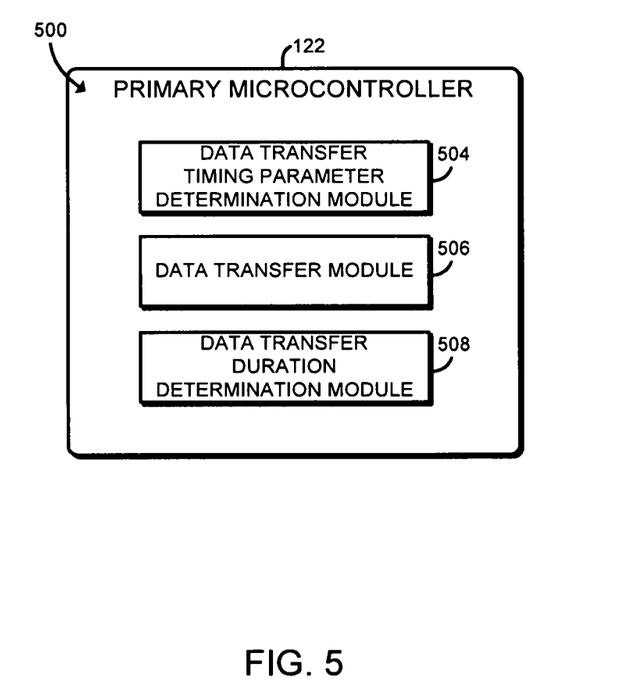
FIG. 5 is a block diagram of at least one embodiment of an environment that may be established by the compute device of FIG. 4.

Referring now to FIG. 5, in use, the primary microcontroller 122 may establish an environment 500. The illustrative environment 500 includes a data transfer timing parameter determination module 504, a data transfer module 506, and a data transfer duration determination module 508. The various modules of the environment 500 may be embodied as hardware, software, firmware, or a combination thereof. For example, the various modules, logic, and other components of the environment 500 may form a portion of, or otherwise be established by, the processor 402 or other hardware components of the compute device 102, such as the memory 404 or the primary microcontroller 122. As such, in some embodiments, one or more of the modules of the environment 500 may be embodied as circuitry or collection of electrical devices (e.g., a data transfer timing parameter determination circuit 504, a data transfer circuit 506, etc.). It should be appreciated that, in such embodiments, one or more of the circuits (e.g., the data transfer timing parameter determination circuit 504, the data transfer circuit 506, etc.) may form a portion of one or more of the processor 402, the memory 404, the I/O subsystem 406, the primary microcontroller 122, and/or the data storage 408. Additionally, in some embodiments, one or more of the illustrative modules may form a portion of another module and/or one or more of the illustrative modules may be independent of one another.

The data transfer timing parameter determination module 504 is configured to determine one or more data transfer timing parameters used as part of the communication process. Illustratively, the data transfer timing parameters include a hold high time period parameter indicative of the period of time for which the clock should be kept high, a hold low time period parameter indicative of the period of time for which the clock should be kept low, a nominal clock frequency, an acceptable range for a duration of data transfer, and an acceptable range for the clock frequency. The nominal clock frequency specifies the frequency at which the voltage of the clock line 108 should switch between high and low. Note that, since the rise time and fall time of the clock line 108 depend on factors not directly controllable by the primary microcontroller 122, such as the resistance of the resistor 120 and the capacitance of the capacitor 118, the primary microcontroller 122 does not directly control the actual frequency at which the voltage of the clock line 108 switches between high and low. In embodiments with the current source 218 of FIG. 2, the data transfer timing parameters may include a current source parameter indicative of whether or not to activate the current source 218 and/or for how long to activate the current source 218. The initial data transfer timing parameters may be stored in the compute device 102, such as in the data storage 408, the memory 404, or the primary microcontroller 122. If an actual frequency of the clock line 108 is determined by the data transfer duration determination module 508 as described below, the data transfer timing parameter determination module 504 updates the one or more data transfer timing parameters to make the actual frequency in future data transfers closer to the nominal frequency.

The data transfer module 506 is configured to carry out a data transfer between the primary microcontroller 122 and the secondary integrated circuit 124. In the illustrative embodiment, as described in more detail above, in order to transfer a single bit of data, the primary microcontroller 122 sets the data line 106 to the desired voltage level (e.g., high for "1", low for "0") while the clock line 108 is low, and then allows the clock line 108 to be pulled up to the voltage of the DC voltage supply line 110 by the resistor 120 (or, in some embodiments, by the current source 218). After the clock line 108 reaches the high voltage level, the primary microcontroller 122 allows the clock line 108 to remain high for a period of time, based on the data transfer timing parameters. During the period of time the clock line 108 is high, the secondary IC 124 reads the data line 106. After the period of time is over, the primary microcontroller 122 pulls the clock line 108 to a low voltage (e.g., to ground). After the clock line 108 reaches the low voltage level, the primary microcontroller 122 allows the clock line 108 to remain low for a second period of time, based on the one or more data transfer timing parameters. While the clock line 108 is high, the primary microcontroller 122 may write a different value to the data line 106, and the process may repeat to send the next bit. Data transfer of a full byte to a specific secondary IC 124 is described below in more detail in regard to FIG. 7. Of course, in other embodiments, a protocol different from the one described above may be used to transfer bits of information.

The data transfer duration determination module 508 is configured to determine a duration of time that the data transfer takes. The data transfer duration determination module 508 may determine the duration of time by recording a time (e.g., based on a number of clock cycles of an internal clock) at the beginning and then end of the data transfer, and determining the difference between those two times. Since the number of bits transferred and therefore the number of times the clock line 108 has cycled between high and low is known, an actual frequency of the clock line 108 can be determined by dividing the number of cycles by the duration of the data transfer.

Figure 6:
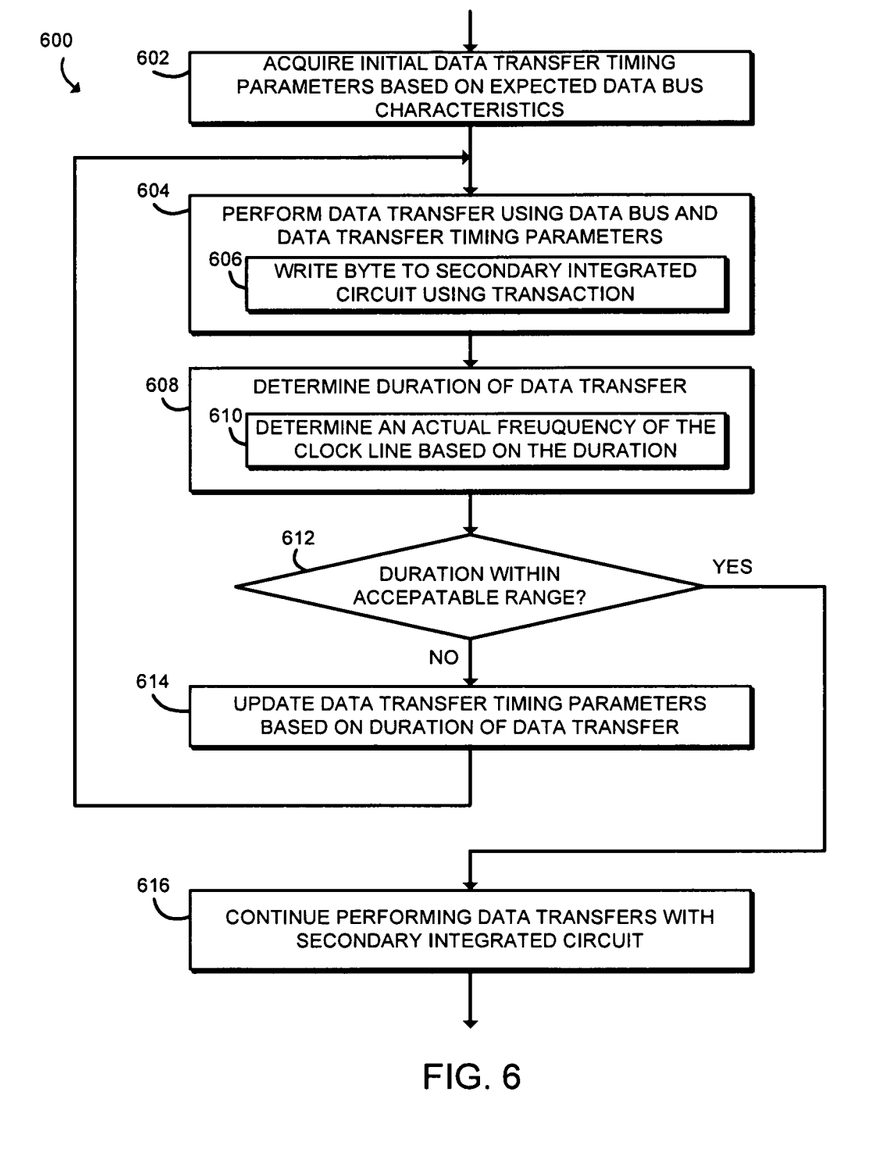
FIG. 6 is a simplified flow diagram of at least one embodiment of a method for controlling a timing calibration of the dedicated inter-integrated circuit data bus that may be executed by the compute device of FIG. 4.

Referring now to FIG. 6, in use, the primary microcontroller 122 may execute a method 600 for controlling a timing calibration of the dedicated inter-IC data bus 104. The method 600 begins with block 602 in which the primary microcontroller 122 acquires initial data transfer parameters. In the illustrative embodiment, the data transfer timing parameters are stored in the firmware or other storage of the primary microcontroller 122, and are based on the expected characteristics of the data bus 104, such as the capacitance of the capacitor 118 on the clock line 108. In other embodiments, the initial data transfer parameters may be determined based on active measurements or the like. In some embodiments, the primary microcontroller 122 may execute the method 600 shortly or immediately after powering on, without any instruction from a user of the compute device 102 or a user of the primary microcontroller 122.

In block 604, the primary microcontroller 122 performs a data transfer using the dedicated inter-IC data bus 104 and the data transfer timing parameters. To do so, in the illustrative embodiment, the primary microcontroller sets the data line 106 and the clock line 108 to high or low as appropriate, as described in more detail below. Additionally, in block 606, the primary microcontroller 122 writes a byte to a secondary IC 124 using a transaction, which is described in more detail in FIG. 7.

In block 608, the primary microcontroller 122 determines a duration of the data transfer performed in block 604. To do so, the primary controller may determine a difference in time between the start of the data transfer and the end of the data transfer. In the illustrative embodiment, in block 610, the primary microcontroller 122 determines an actual frequency of the clock line 108 by dividing the number of times the clock line 108 fully cycled by the duration of the data transfer.

Subsequently, in block 612, the primary microcontroller 122 determines if the duration of the data transfer is within an acceptable range. In some embodiments, the acceptable range may define one of the data transfer timing parameters. The microcontroller 122 may determine whether the duration of the data transfer is within an acceptable range by comparing the duration of the data transfer to a high threshold and/or a low threshold. Each of the high and low thresholds may define a parameter of the data transfer timing parameters, or may be determined based on a nominal duration parameter of the data transfer timing parameters. For example, the high threshold may be 101% or 110% of the nominal duration, and the low threshold may be 99% or 90% of the nominal duration. In additional embodiments, determining if the duration of the data transfer is within an acceptable range may be done by comparing the frequency of the data transfer to a high threshold and/or a low threshold. Each of the high and low thresholds in such an embodiment may be a parameter of the data transfer timing parameters, or may be determined based on a nominal frequency parameter of the data transfer timing parameters. For example, the high threshold may be 101% or 110% of the nominal frequency, and the low threshold may be 99% or 90% of the nominal frequency. If the duration is within the acceptable range, the primary microcontroller 122 continues performing data transfers with the secondary IC 124 in block 616.

If the primary microcontroller 122 determines that the duration is within the acceptable range, the method 600 advances to block 616 in which primary microcontroller 122 continues performing data transfers with the secondary IC 124 using the present data transfer timing parameters. If, however, the primary microcontroller 122 determines that the duration is not within the acceptable range, the method 600 advances to block 614 in which primary microcontroller 122 updates the data transfer timing parameters based on the duration of the data transfer. For example, if the duration of the data transfer is too low, the primary microcontroller 122 may increase the period of time for which the clock should be kept high and/or increase the period of time for which the clock should be kept low. If the duration of the data transfer is too high, the primary microcontroller 122 may decrease the period of time for which the clock should be kept high and/or decrease the period of time for which the clock should be kept low. In embodiments in which the primary microcontroller 122 includes the current source 218 (see FIG. 2), the primary microcontroller 122 may determine to activate the current source 218 in order to drive the clock line 108 high when appropriate (e.g., when the primary microcontroller 122 is allowing the clock line 108 to switch from low to high). Regardless, after the primary microcontroller 122 updates the data transfer timing parameters in block 614, the method 600 loops back to block 604 in which the primary microcontroller 122 performs another data transfer to monitor the timing of the dedicated inter-IC data bus 104. Of course, in some embodiments, the primary microcontroller 122 may pause between iterations of blocks 604-616 such that the timing of the dedicated inter-IC data bus 104 is checked periodically.

Figure 7:
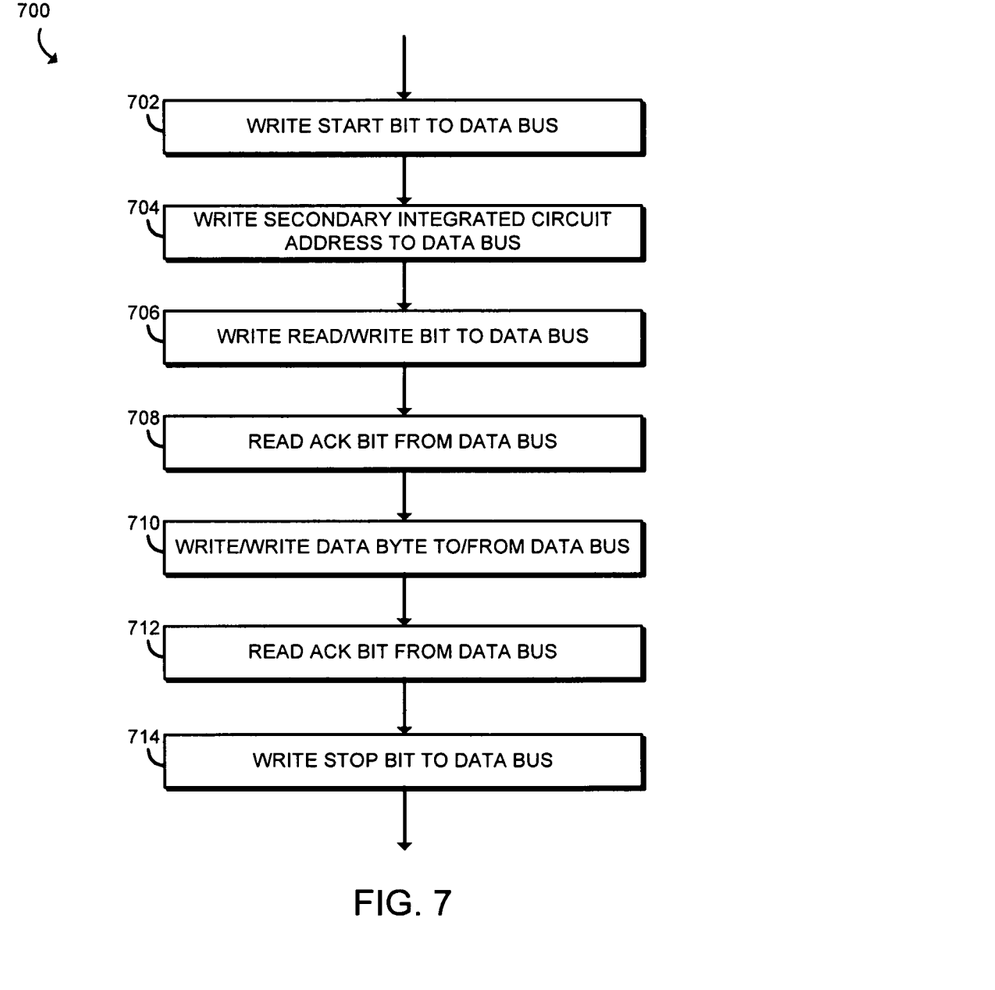
FIG. 7 is a simplified flow diagram of at least one embodiment of a method for communicating using the system of FIG. 1.

Referring now to FIG. 7, in use, the primary microcontroller 122 executes a method 700 for a data transfer with a transaction, which may be one embodiment of block 606 of method 600 of FIG. 6. The transaction may be embodied as a single complete interaction between a primary microcontroller 122 and a target secondary IC 124, which includes both an address specifying which secondary IC 124 is the target of the transaction, as well as several bits of information either sent to the secondary IC 124 by the primary microcontroller 122 or sent to the primary microcontroller 122 by the secondary IC 124.

The method 700 begins with block 702 in which the primary microcontroller 122 writes a start bit to the data bus 104. To do so, the primary microcontroller 122 may pull the data line 106 to the low voltage while the clock line 108 is high. Note that such action is in contrast to the state of the clock line 108 when data bits are written by changing the data line 106. As described above in regard transfer of single bits by the data transfer module 506 of FIG. 5, when data bits are written by changing the data line 106, the clock line 108 is typically low. The details of transferring a single bit will not be repeated herein for the sake of clarity.

In block 704, the primary microcontroller 122 writes an address of the target secondary IC 124 so that the target secondary IC 124 knows to respond, and so that non-targeted secondary ICs 124 know not to respond. In the illustrative embodiment, the address is 7 bits long, but may have a different length in other embodiments. In block 706, the primary microcontroller 122 writes a single bit indicating whether the primary microcontroller 122 is writing to the secondary IC 124 or reading from the secondary IC 124.

In block 708, the primary microcontroller 122 reads an acknowledge (or "ack") bit from the secondary IC 124. Of course, in block 708, the primary microcontroller 122 does not read the data line 106, and the secondary IC 124 controls the data line 106. The targeted secondary IC 124 pulls the data line 106 down in order to acknowledge that it is being addressed. If there is no acknowledgement (i.e., the data line 106 remains high), an error has occurred.

In block 710, the primary microcontroller 122 reads or writes a byte to or from the data bus 104 by reading or writing 8 bits, one at a time. If the primary microcontroller 122 is writing bits, it is either pulling the data line 106 down to low or allowing it to float to high as appropriate. If the primary microcontroller 122 is reading bits, the secondary IC 124 is either pulling the data line 106 down to low or allowing it to float to high as appropriate. In either case, the primary microcontroller 122 is controlling the clock line 108 (unless the secondary IC 124 is employing "clock stretching," described above in regard to FIG. 3).

In block 712, the primary microcontroller 122 reads an acknowledge bit from the secondary IC 124, in a manner similar to block 708. In block 714, the primary microcontroller 122 writes a stop bit to the data bus 104, by allowing the data line 106 to float to high from low, while the clock line 108 is high. Again, like the case of writing the start bit in block 702, this is in contrast to the state of the clock line 108 when a data bit is being written. After the stop bit is written, the transaction is complete.

Figure 8:
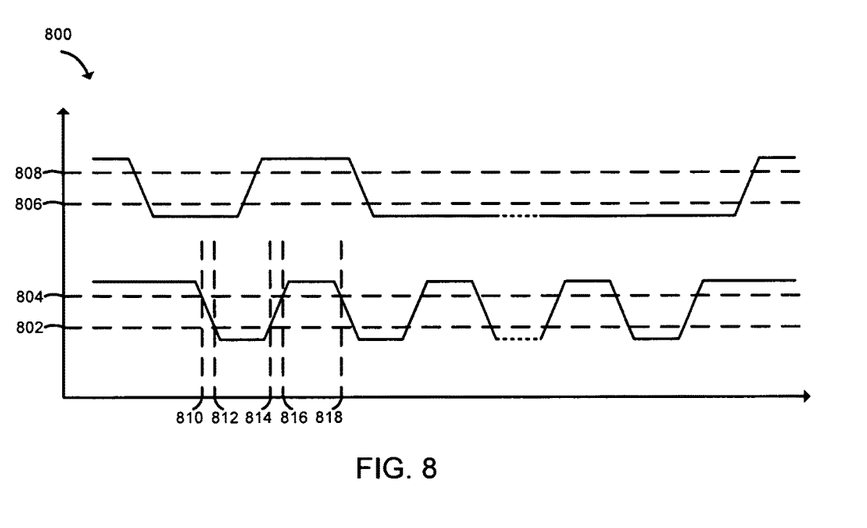
FIG. 8 is a simplified timing diagram of at least one embodiment of communication using the system of FIG. 1.

Referring now to FIG. 8, a timing diagram 800 is depicted showing a sample voltage as a function of time in one embodiment of a transaction of FIG. 7. The voltage of the data line 106 is shown on top, and the voltage of the clock line 108 is shown on bottom. Voltage level 802 indicates the threshold for "low" for the clock line 108, voltage level 804 indicates the threshold for "high" for the clock line 108, voltage level 806 indicates the threshold for "low" for the data line 106, and voltage level 808 indicates the threshold for "high" for the data line 106. The primary microcontroller 122 writes the "start bit" by pulling the data line 106 down below the voltage 806, while the clock line 108 is above the voltage 804. The primary microcontroller 122 subsequently pulls the clock line 108 low. The "fall time" of the clock line 108 is the time it takes for the clock line 108 to transition between voltage 804 and voltage 802, as shown by the time between time 810 and time 812. While the clock is low, the primary microcontroller 122 writes the desired value to the data line 106. The primary microcontroller 122 then allows clock to rise from the low voltage 802 at time 814 to the high voltage 804 at time 816. The time between 814 and 816 is the "rise time" of the clock line 108. While the clock line 108 is high, the secondary IC 124 can read the data line 106. This pattern continues, with the primary microcontroller 122 writing data bits to the data line 106 while the clock line 108 is low, and the secondary IC 124 reading data bits from the data line 106 while the clock line 108 is high. At the end of a transaction, the primary microcontroller 122 writes the "stop bit" by allowing the data line 106 to float to high while the clock line 108 is high. Note that, in the current invention, certain parameters such as the hold low period between time 812 and 814 or the hold high period between times 816 and 818 may be adjusted based on the duration of a data transfer, as discussed above.

In the illustrative embodiment, the "rise time" of the clock line 108 is limited by the "RC time constant" of the resistor 120 and the capacitor 118. In some embodiments, the "rise time" of the clock line 108 can be reduced by using the current source 218.

EXAMPLES

Illustrative examples of the devices, systems, and methods disclosed herein are provided below. An embodiment of the devices, systems, and methods may include any one or more, and any combination of, the examples described below.

Example 1 includes a system for controlling a timing calibration of a dedicated inter-integrated (IC) data bus, the system comprising a microcontroller comprising a data transfer timing parameter determination module to acquire one or more data transfer timing parameters; a data transfer module to perform, using the dedicated inter-IC data bus, a data transfer to a secondary integrated circuit communicatively coupled to the dedicated inter-IC data bus using the one or more data transfer timing parameters; and a data transfer duration determination module to (i) determine a duration of the data transfer and (ii) update, based on the duration of the data transfer, the one or more data transfer timing parameters.

Example 2 includes the subject matter of Example 1, and wherein the dedicated inter-IC data bus comprises a clock line, wherein the one or more data transfer timing parameters comprise a hold high time period associated with the clock line and a hold low time period associated with the clock line, and wherein to update, based on the duration of the data transfer, the one or more data transfer timing parameters comprises to update, based on the duration of the data transfer, at least one of the hold high time period and the hold low time period.

Example 3 includes the subject matter of any of Examples 1 and 2, and further including the dedicated inter-IC data bus and a plurality of secondary ICs, wherein each secondary IC is communicatively coupled to the dedicated inter-IC data bus, and wherein to perform a data transfer comprises to send, by the data transfer module and using the dedicated inter-IC data bus, an address to the plurality of secondary ICs, wherein the address indicates a targeted secondary IC, acknowledge, by the targeted secondary IC and using the dedicated inter-IC data bus, the sent address, and send, by the data transfer module and using the dedicated inter-IC data bus, data to the targeted secondary IC.

Example 4 includes the subject matter of any of Examples 1-3, and wherein the dedicated inter-IC data bus comprises a clock line and a data line.

Example 5 includes the subject matter of any of Examples 1-4, and wherein the one or more parameters comprise a current source parameter indicative of an activation of a current source to pull up a clock line of the inter-IC data bus, and wherein to update, based on the duration of the data transfer, the one or more data transfer timing parameters comprises to update, based on the duration of the data transfer, the current source parameter.

Example 6 includes the subject matter of any of Examples 1-5, and wherein the data transfer comprises a transaction.

Example 7 includes the subject matter of any of Examples 1-6, and wherein to perform the data transfer comprises to send a start bit and to send a stop bit, and wherein to determine the duration of the data transfer comprises to determine a duration of the data transfer based on a duration between the start bit and the stop bit.

Example 8 includes the subject matter of any of Examples 1-7, and wherein the dedicated inter-IC data bus comprises a clock line, wherein the one or more data transfer timing parameters comprise an acceptable range of the duration of the data transfer, a hold high time period associated with the clock line, and a hold low time period associated with the clock line, wherein the data transfer timing parameter determination module is further to determine whether the duration of the data transfer is within the acceptable range, wherein to update the one or more data transfer timing parameters comprises to update, in response to a determination that the duration of the data transfer is not within the acceptable range, at least one of the hold high time period and the hold low time period.

Example 9 includes the subject matter of any of Examples 1-8, and wherein the dedicated inter-IC data bus comprises a clock line, wherein to determine a duration of the data transfer comprises to determine a frequency of the clock line.

Example 10 includes the subject matter of any of Examples 1-9, and wherein the one or more data transfer timing parameters comprise an acceptable range of the frequency of the clock line, a hold high time period associated with the clock line, and a hold low time period associated with the clock line, wherein the data transfer timing parameter determination module is further to determine whether the frequency of the clock line is within the acceptable range, wherein to update the one or more data transfer timing parameters comprises to update, in response to a determination that the frequency of the clock line is not within the acceptable range, at least one of the hold high time period and the hold low time period.

Example 11 includes the subject matter of any of Examples 1-10, and wherein the microcontroller is configured to acquire the one or more data transfer timing parameters, perform the data transfer, determine the duration of the data transfer, and update the one or more data transfer timing parameters without instruction from a user of the microcontroller.

Example 12 includes a method for controlling a timing calibration of a dedicated inter-integrated circuit (IC) data bus, the method comprising acquiring, by a microcontroller, one or more data transfer timing parameters; performing, by the microcontroller and using the dedicated inter-IC data bus, a data transfer to a secondary integrated circuit communicatively coupled to the dedicated inter-IC data bus using the one or more data transfer timing parameters; determining, by the microcontroller, a duration of the data transfer; and updating, by the microcontroller and based on the duration of the data transfer, the one or more data transfer timing parameters.

Example 13 includes the subject matter of Examples 12, and wherein the one or more data transfer timing parameters comprise a hold high time period associated with a clock line of the dedicated inter-IC data bus and a hold low time period associated with the clock line, and wherein updating, based on the duration of the data transfer, the one or more data transfer timing parameters comprises updating, based on the duration of the data transfer, at least one of the hold high time period and the hold low time period.

Example 14 includes the subject matter of any of Examples 12 and 13, and wherein performing a data transfer comprises sending, by the microcontroller and using the dedicated inter-IC data bus, an address to a plurality of secondary ICs, wherein each secondary IC is communicatively coupled to the dedicated inter-IC data bus, wherein the address indicates a targeted secondary IC; acknowledging, by the targeted secondary IC and using the dedicated inter-IC data bus, the sent address; and sending, by the microcontroller and using the dedicated inter-IC data bus, data to the targeted secondary IC.

Example 15 includes the subject matter of any of Examples 12-14, and wherein the dedicated inter-IC data bus comprises a clock line and a data line.

Example 16 includes the subject matter of any of Examples 12-15, and wherein the one or more parameters comprise a current source parameter indicative of an activation of a current source to pull up a clock line of the inter-IC data bus, and wherein updating, based on the duration of the data transfer, the one or more data transfer timing parameters comprises updating, based on the duration of the data transfer, the current source parameter.

Example 17 includes the subject matter of any of Examples 12-16, and wherein the data transfer comprises a transaction.

Example 18 includes the subject matter of any of Examples 12-17, and wherein performing the data transfer comprises sending, by the microcontroller, a start bit and sending, by the microcontroller, a stop bit, and wherein determining the duration of the data transfer comprises determining a duration of the data transfer based on a duration between sending the start bit and sending the stop bit.

Example 19 includes the subject matter of any of Examples 12-18, and wherein the one or more data transfer timing parameters comprise an acceptable range of the duration of the data transfer, a hold high time period associated with a clock line of the dedicated inter-IC data bus, and a hold low time period associated with the clock line, and further comprising determining whether the duration of the data transfer is within the acceptable range, wherein updating the one or more data transfer timing parameters comprises updating, in response to a determination that the duration of the data transfer is not within the acceptable range, at least one of the hold high time period and the hold low time period.

Example 20 includes the subject matter of any of Examples 12-19, and wherein determining a duration of the data transfer comprises determining a frequency of the clock line of the dedicated inter-IC data bus.

Example 21 includes the subject matter of any of Examples 12-20, and wherein the one or more data transfer timing parameters comprise an acceptable range of the frequency of the clock line, a hold high time period associated with the clock line, and a hold low time period associated with the clock line, further comprising determining whether the frequency of the clock line is within the acceptable range, wherein updating the one or more data transfer timing parameters comprises updating, in response to a determination that the frequency of the clock line is not within the acceptable range, at least one of the hold high time period and the hold low time period.

Example 22 includes the subject matter of any of Examples 12-21, and wherein acquiring the one or more data transfer timing parameters comprises acquiring the one or more data transfer timing parameters without instruction from a user of the microcontroller, performing the data transfer to the secondary integrated circuit comprises performing the data transfer to the secondary integrated circuit without instruction from the user; determining the duration of the data transfer comprises determining the duration of the data transfer without instruction from the user; and updating the one or more data transfer timing parameters comprises updating the one or more data transfer timing parameters without instruction from the user.

Example 23 includes one or more machine-readable storage media comprising a plurality of instructions stored thereon that in response to being executed result in a computing device performing the method of any of Examples 11-22.

Example 24 includes a system for controlling a timing calibration of a dedicated inter-integrated (IC) data bus, the system comprising means for acquiring one or more data transfer timing parameters; means for performing, using the dedicated inter-IC data bus, a data transfer to a secondary integrated circuit communicatively coupled to the dedicated inter-IC data bus using the one or more data transfer timing parameters; means for determining a duration of the data transfer; and means for updating, based on the duration of the data transfer, the one or more data transfer timing parameters.

Example 25 includes the subject matter of Example 24, and wherein the one or more data transfer timing parameters comprise a hold high time period associated with a clock line of the dedicated inter-IC data bus and a hold low time period associated with the clock line, and wherein the means for updating, based on the duration of the data transfer, the one or more data transfer timing parameters comprises means for updating, based on the duration of the data transfer, at least one of the hold high time period and the hold low time period.

Example 26 includes the subject matter of any of Examples 24 and 25, and wherein the means for performing a data transfer comprises means for sending, using the dedicated inter-IC data bus, an address to a plurality of secondary ICs, wherein each secondary IC is communicatively coupled to the dedicated inter-IC data bus, wherein the address indicates a targeted secondary IC; means for acknowledging, by the targeted secondary IC and using the dedicated inter-IC data bus, the sent address; and means for sending, using the dedicated inter-IC data bus, data to the targeted secondary IC.

Example 27 includes the subject matter of any of Examples 24-26, and wherein the dedicated inter-IC data bus comprises a clock line and a data line.

Example 28 includes the subject matter of any of Examples 24-27, and wherein the one or more parameters comprise a current source parameter indicative of an activation of a current source to pull up a clock line of the inter-IC data bus, and wherein the means for updating, based on the duration of the data transfer, the one or more data transfer timing parameters comprises means for updating, based on the duration of the data transfer, the current source parameter.

Example 29 includes the subject matter of any of Examples 24-28, and wherein the data transfer comprises a transaction.

Example 30 includes the subject matter of any of Examples 24-29, and wherein the means for performing the data transfer comprises means for sending, by the microcontroller, a start bit and means for sending, by the microcontroller, a stop bit, and wherein the means for determining the duration of the data transfer comprises means for determining a duration of the data transfer based on a duration between sending the start bit and sending the stop bit.

Example 31 includes the subject matter of any of Examples 24-30, and wherein the one or more data transfer timing parameters comprise an acceptable range of the duration of the data transfer, a hold high time period associated with a clock line of the dedicated inter-IC data bus, and a hold low time period associated with the clock line, and further comprising means for determining whether the duration of the data transfer is within the acceptable range, wherein the means for updating the one or more data transfer timing parameters comprises means for updating, in response to a determination that the duration of the data transfer is not within the acceptable range, at least one of the hold high time period and the hold low time period.

Example 32 includes the subject matter of any of Examples 24-31, and wherein the means for determining a duration of the data transfer comprises means for determining a frequency of the clock line of the dedicated inter-IC data bus.

Example 33 includes the subject matter of any of Examples 24-32, and wherein the one or more data transfer timing parameters comprise an acceptable range of the frequency of the clock line, a hold high time period associated with the clock line, and a hold low time period associated with the clock line, further comprising means for determining whether the frequency of the clock line is within the acceptable range, wherein the means for updating the one or more data transfer timing parameters comprises means for updating, in response to a determination that the frequency of the clock line is not within the acceptable range, at least one of the hold high time period and the hold low time period.

Example 34 includes the subject matter of any of Examples 24-33, and wherein the means for acquiring the one or more data transfer timing parameters comprises means for acquiring the one or more data transfer timing parameters without instruction from a user of the microcontroller, the means for performing the data transfer to the secondary integrated circuit comprises means for performing the data transfer to the secondary integrated circuit without instruction from the user; the means for determining the duration of the data transfer comprises means for determining the duration of the data transfer without instruction from the user; and the means for updating the one or more data transfer timing parameters comprises means for updating the one or more data transfer timing parameters without instruction from the user.

The invention claimed is:

1. A system for controlling a timing calibration of a dedicated inter-integrated circuit (IC) data bus, the system comprising:
    a microcontroller comprising:
        a data transfer timing parameter determination module to acquire one or more data transfer timing parameters comprising at least one of (i) a hold high time period associated with a clock line of the dedicated inter-IC data bus and a hold low time period associated with the clock line or (ii) a current source parameter indicative of an activation of a current source to pull up the clock line;
        a data transfer module to perform, using the dedicated inter-IC data bus, a data transfer to a secondary integrated circuit communicatively coupled to the dedicated inter-IC data bus using the one or more data transfer timing parameters; and
        a data transfer duration determination module to (i) determine a duration of the data transfer and (ii) update, based on the duration of the data transfer, the one or more data transfer timing parameters, wherein to update the one or more data transfer timing parameters comprises to update, based on the duration of the data transfer, at least one of (i) the hold high time period, (ii) the hold low time period, or (iii) the current source parameter.

2. The system of claim 1,
    wherein the one or more data transfer timing parameters comprise the hold high time period and the hold low time period, and
    wherein to update, based on the duration of the data transfer, the one or more data transfer timing parameters comprises to update, based on the duration of the data transfer, at least one of the hold high time period and the hold low time period.

3. The system of claim 2, further comprising the dedicated inter-IC data bus and a plurality of secondary ICs, wherein each secondary IC is communicatively coupled to the dedicated inter-IC data bus, and wherein to perform a data transfer comprises to:
    send, by the data transfer module and using the dedicated inter-IC data bus, an address to the plurality of secondary ICs, wherein the address indicates a targeted secondary IC,
    acknowledge, by the targeted secondary IC and using the dedicated inter-IC data bus, the sent address, and
    send, by the data transfer module and using the dedicated inter-IC data bus, data to the targeted secondary IC.

4. The system of claim 3, wherein the dedicated inter-IC data bus comprises a data line.

5. The system of claim 1, wherein the one or more data transfer timing parameters comprise the current source parameter, and wherein to update, based on the duration of the data transfer, the one or more data transfer timing parameters comprises to update, based on the duration of the data transfer, the current source parameter.

6. The system of claim 1, wherein the data transfer comprises a transaction.

7. The system of claim 6, wherein to perform the data transfer comprises to send a start bit and to send a stop bit, and wherein to determine the duration of the data transfer comprises to determine a duration of the data transfer based on a duration between the start bit and the stop bit.

8. The system of claim 1,
    wherein the one or more data transfer timing parameters comprise an acceptable range of the duration of the data transfer, the hold high time period, and the hold low time period,
    wherein the data transfer timing parameter determination module is further to determine whether the duration of the data transfer is within the acceptable range,
    wherein to update the one or more data transfer timing parameters comprises to update, in response to a determination that the duration of the data transfer is not within the acceptable range, at least one of the hold high time period and the hold low time period.

9. The system of claim 1, wherein the microcontroller is configured to acquire the one or more data transfer timing parameters, perform the data transfer, determine the duration of the data transfer, and update the one or more data transfer timing parameters without instruction from a user of the microcontroller.

10. One or more non-transitory computer-readable media comprising a plurality of instructions stored thereon that, when executed, cause a microcontroller to:
    acquire one or more data transfer timing parameters associated with a dedicated inter-integrated circuit (IC) data bus, the one or more parameters comprising at least one of (i) a hold high time period associated with a clock line of the dedicated inter-IC data bus and a hold low time period associated with the clock line or (ii) a current source parameter indicative of an activation of a current source to pull up the clock line;
    perform, using the dedicated inter-IC data bus, a data transfer to a secondary integrated circuit communicatively coupled to the dedicated inter-IC data bus using the one or more data transfer timing parameters;
    determine a duration of the data transfer; and
    update, based on the duration of the data transfer, the one or more data transfer timing parameters, wherein to update the one or more data transfer parameters comprises to update, based on the duration of the data transfer, at least one of (i) the hold high time period, (ii) the hold low time period, or (iii) the current source parameter.

11. The one or more non-transitory computer-readable media of claim 10, wherein the one or more data transfer timing parameters comprise the hold high time period and the hold low time period, and
wherein to update, based on the duration of the data transfer, the one or more data transfer timing parameters comprises to update, based on the duration of the data transfer, at least one of the hold high time period and the hold low time period.

12. The one or more non-transitory computer-readable media of claim 11, wherein to perform a data transfer comprises to:
send, by the microcontroller and using the dedicated inter-IC data bus, an address to a plurality of secondary ICs, wherein each secondary IC is communicatively coupled to the dedicated inter-IC data bus, wherein the address indicates a targeted secondary IC;
receive, using the dedicated inter-IC data bus, an acknowledgement of the sent address from the targeted secondary IC; and
send, using the dedicated inter-IC data bus, data to the targeted secondary IC.

13. The one or more non-transitory computer-readable media of claim 10, wherein the one or more data transfer timing parameters comprise the current source parameter, and wherein to update, based on the duration of the data transfer, the one or more data transfer timing parameters comprises to update, based on the duration of the data transfer, the current source parameter.

14. The one or more non-transitory computer-readable media of claim 10, wherein the data transfer comprises a transaction.

15. The one or more non-transitory computer-readable media of claim 14, wherein to perform the data transfer comprises to send a start bit at a start time and to send a stop bit at a stop time, and wherein to determine the duration of the data transfer comprises to determine a duration of the data transfer based on a duration between the start time and the stop time.

16. The one or more non-transitory computer-readable media of claim 10,
wherein the one or more data transfer timing parameters comprise an acceptable range of the duration of the data transfer, the hold high time period, and the hold low time period,
wherein the plurality of instructions further cause the microcontroller to determine whether the duration of the data transfer is within the acceptable range, and
wherein to update the one or more data transfer timing parameters comprises to update, in response to a determination that the duration of the data transfer is not within the acceptable range, at least one of the hold high time period and the hold low time period.

17. The one or more non-transitory computer-readable media of claim 10, wherein:
to acquire the one or more data transfer timing parameters comprises to acquire the one or more data transfer timing parameters without instruction from a user of the microcontroller,
to perform the data transfer to the secondary integrated circuit comprises to perform the data transfer to the secondary integrated circuit without instruction from the user;
to determine the duration of the data transfer comprises to determine the duration of the data transfer without instruction from the user; and
to update the one or more data transfer timing parameters comprises to update the one or more data transfer timing parameters without instruction from the user.

18. A method for controlling a timing calibration of a dedicated inter-integrated circuit (IC) data bus, the method comprising:
acquiring, by a microcontroller, one or more data transfer timing parameters comprising at least one of (i) a hold high time period associated with a clock line of the dedicated inter-IC data bus and a hold low time period associated with the clock line or (ii) a current source parameter indicative of an activation of a current source to pull up the clock line;
performing, by the microcontroller and using the dedicated inter-IC data bus, a data transfer to a secondary integrated circuit communicatively coupled to the dedicated inter-IC data bus using the one or more data transfer timing parameters;
determining, by the microcontroller, a duration of the data transfer; and
updating, by the microcontroller and based on the duration of the data transfer, the one or more data transfer timing parameters, wherein updating the one or more data transfer parameters comprises updating, based on the duration of the data transfer, at least one of (i) the hold high time period, (ii) the hold low time period, or (iii) the current source parameter.

19. The method of claim 18, wherein the one or more data transfer timing parameters comprise the hold high time period and the hold low time period, and
wherein updating, based on the duration of the data transfer, the one or more data transfer timing parameters comprises updating, based on the duration of the data transfer, at least one of the hold high time period and the hold low time period.

20. The method of claim 19, wherein performing a data transfer comprises:
sending, by the microcontroller and using the dedicated inter-IC data bus, an address to a plurality of secondary ICs, wherein each secondary IC is communicatively coupled to the dedicated inter-IC data bus, wherein the address indicates a targeted secondary IC;
acknowledging, by the targeted secondary IC and using the dedicated inter-IC data bus, the sent address; and
sending, by the microcontroller and using the dedicated inter-IC data bus, data to the targeted secondary IC.

21. The method of claim 18, wherein the one or more data transfer timing parameters comprise the current source parameter, and wherein updating, based on the duration of the data transfer, the one or more data transfer timing parameters comprises updating, based on the duration of the data transfer, the current source parameter.

22. The method of claim 18, wherein the data transfer comprises a transaction.

23. The method of claim 22, wherein performing the data transfer comprises sending, by the microcontroller, a start bit and sending, by the microcontroller, a stop bit, and wherein determining the duration of the data transfer comprises determining a duration of the data transfer based on a duration between sending the start bit and sending the stop bit.

24. The method of claim 18, wherein the one or more data transfer timing parameters comprise an acceptable range of the duration of the data transfer, the hold high time period, and the hold low time period, and further comprising determining whether the duration of the data transfer is within the acceptable range, wherein updating the one or more data transfer timing parameters comprises updating, in response to a determination that the duration of the data transfer is not within the acceptable range, at least one of the hold high time period and the hold low time period.

25. The method of claim 18, wherein:

acquiring the one or more data transfer timing parameters comprises acquiring the one or more data transfer timing parameters without instruction from a user of the microcontroller, performing the data transfer to the secondary integrated circuit comprises performing the data transfer to the secondary integrated circuit without instruction from the user;

determining the duration of the data transfer comprises determining the duration of the data transfer without instruction from the user; and updating the one or more data transfer timing parameters comprises updating the one or more data transfer timing parameters without instruction from the user.

* * * * *